US011146180B2

(12) United States Patent
Mohamed Sayed Ahmed et al.

(10) Patent No.: US 11,146,180 B2
(45) Date of Patent: Oct. 12, 2021

(54) LINEAR AND NONLINEAR DYNAMIC BUS CONTROL FOR AFE APPLICATIONS

(71) Applicant: Rockwell Automation Technologies, Inc., Mayfield Heights, OH (US)

(72) Inventors: Ahmed S. Mohamed Sayed Ahmed, Mequon, WI (US); Steven M. Wirtz, Mequon, WI (US); Joseph S. Klak, Mayfield, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 87 days.

(21) Appl. No.: 16/671,794

(22) Filed: Nov. 1, 2019

(65) Prior Publication Data

US 2021/0135589 A1   May 6, 2021

(51) Int. Cl.
*H02J 1/00* (2006.01)
*H02M 5/458* (2006.01)

(52) U.S. Cl.
CPC ............. *H02M 5/4585* (2013.01); *H02J 1/00* (2013.01)

(58) Field of Classification Search
USPC .......................................................... 307/31
See application file for complete search history.

(56) References Cited

U.S. PATENT DOCUMENTS

| 8,519,659 | B2 | 8/2013 | Someya |
| 9,126,379 | B2 | 9/2015 | Uchiyama et al. |
| 10,122,175 | B1 | 11/2018 | Zhang et al. |
| 2007/0216343 | A1* | 9/2007 | Rozman ............... H02M 5/4585 318/811 |
| 2008/0016940 | A1 | 1/2008 | Schmeink |
| 2011/0292695 | A1 | 12/2011 | Skibinski et al. |

(Continued)

FOREIGN PATENT DOCUMENTS

| DE | 10 2010 025647 A1 | 12/2011 |
| DE | 102010025647 | * 12/2011 |
| EP | 1 880 837 A2 | 1/2008 |

OTHER PUBLICATIONS

Manekar et al., "Modeling Methods of Three Phase Induction Motor", National Conference of Innovative Paradigms in Engineering & Technology (NCIPET—2013), Proceedings published by International Journal of Computer Applications® (IJCA), pp. 16-20.

(Continued)

*Primary Examiner* — Toan T Vu
*Assistant Examiner* — Xuan Ly
(74) *Attorney, Agent, or Firm* — Fay Sharpe LLP

(57) ABSTRACT

A power converter having a dynamic bus controller to control a rectifier DC output for motoring and regenerating power flow directions, in which the controller controls a DC bus voltage between first and second regenerating voltage limits and limits power at the DC output in an increasing fashion with increasing values of the DC bus voltage according to a regenerating power limit parameter for a regenerating direction of power flow at a DC output. For a motoring direction of power flow at the DC output, the controller controls the DC bus voltage at the DC output between first and second motoring voltage limits and limits the power at the DC output in a decreasing fashion with increasing values of the DC bus voltage according to a motoring power limit parameter.

18 Claims, 12 Drawing Sheets

(56) References Cited

U.S. PATENT DOCUMENTS

2012/0068636 A1  3/2012  Iwashita et al.
2013/0106328 A1  5/2013  Kopiness et al.
2014/0265596 A1  9/2014  Yuan et al.
2017/0272023 A1  9/2017  Ahmed et al.
2017/0331389 A1  11/2017  Ahmed et al.

OTHER PUBLICATIONS

Putz et al., "Energy storage in drive systems of servo presses for reduction of peak power and energy recovery", In: 2016 18th European Conference on Power Electronics and Applications (EPE'16 ECCE Europe), pp. 1-10, IEEE (2016).
Siemens, "Siemens Servo Press Energy Management," Solutions for metal forming, Siemens AG 2016, 11 pages.
European Extended Search Report dated Mar. 17, 2021 of corresponding European Patent Application No. 20204813.8, 9 pages.

* cited by examiner

LINEAR AND NONLINEAR DYNAMIC BUS CONTROL FOR AFE APPLICATIONS

BACKGROUND

The disclosed subject matter relates to power conversions, active rectifiers, and control techniques therefor.

SUMMARY

Various aspects of the present disclosure are now summarized to facilitate a basic understanding of the disclosure, wherein this summary is not an extensive overview of the disclosure and is intended neither to identify certain elements of the disclosure, nor to delineate the scope thereof. Rather, the primary purpose of this summary is to present the concept of the disclosure in a simplified form prior to the more detailed description that is presented hereinafter.

In accordance with one aspect, a power converter includes an AC input, DC output, a switching circuit, and a controller configured to selectively regulate a DC bus voltage between first and second voltage limits and limit the power at the DC output according to the DC bus voltage. In accordance with another aspect, a method includes controlling a DC bus voltage at the DC output between first and second regenerating voltage limits, and limiting power at the DC output according to a regenerating power limit parameter for a motoring direction of power flow at the DC output, as well as controlling the DC bus voltage at the DC output between first and second motoring voltage limits and limiting power at the DC output according to a motoring power limit parameter for a regenerating direction of power flow at a DC output. In a further aspect, a non-transitory computer readable medium includes computer executable instructions, which, when executed by a processor, cause the processor to control a DC bus voltage at the DC output between first and second regenerating voltage limits and limit power at the DC output according to a regenerating power limit parameter for a regenerating direction of power flow at a DC output of a rectifier, and to control the DC bus voltage at the DC output between first and second motoring voltage limits and limit power at the DC output according to a motoring power limit parameter for a motoring direction of power flow at the DC output.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

DETAILED DESCRIPTION

Figure 1:
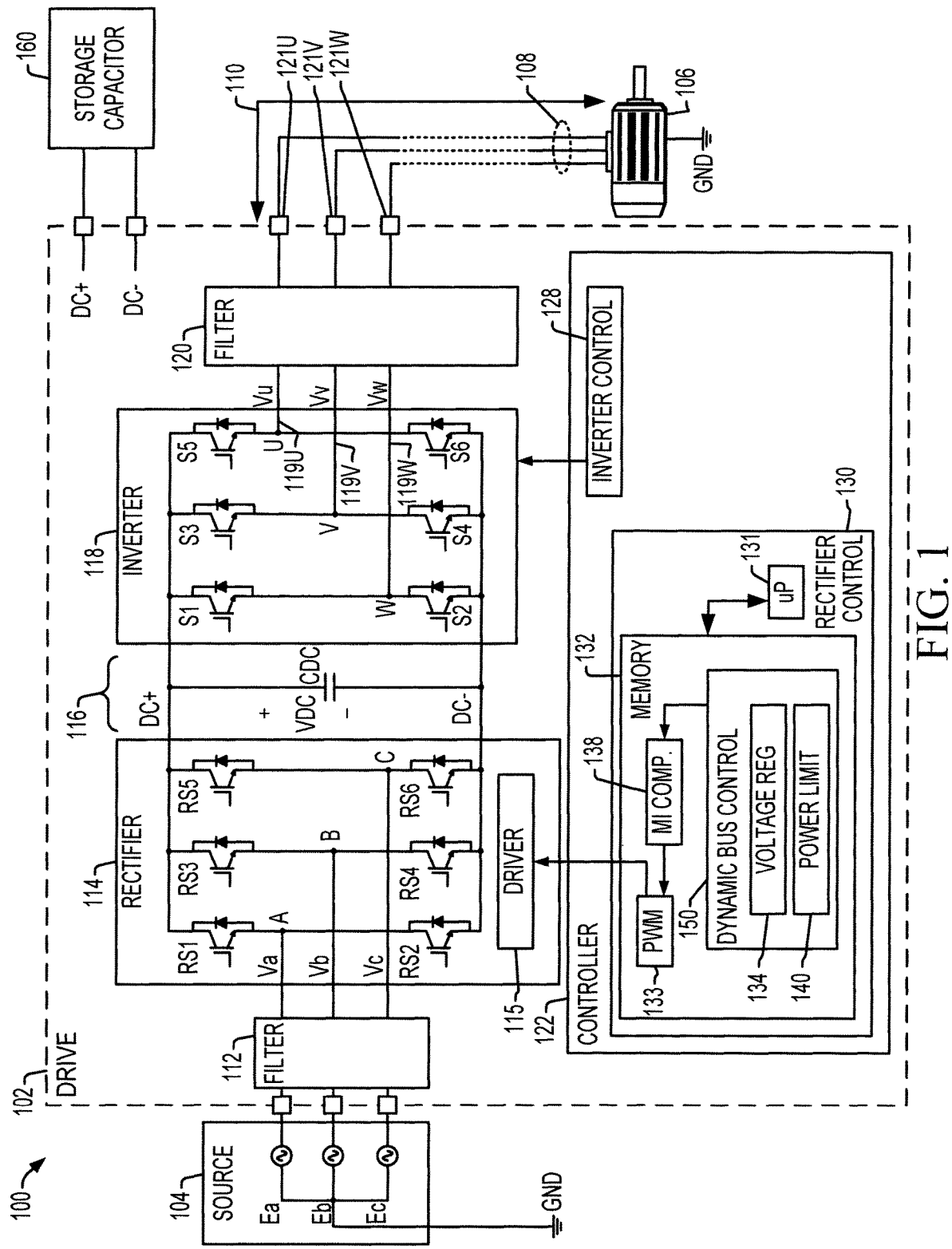
FIG. 1 is a schematic diagram of a power converter.

Referring now to the figures, several embodiments or implementations are hereinafter described in conjunction with the drawings, wherein like reference numerals are used to refer to like elements throughout, and wherein the various features are not necessarily drawn to scale. Active Front End (AFE) power converters are AC-DC switching rectifiers that operate according to switching control signals to convert power between AC and DC forms. AFE converters can convert AC input power, for example, from a grid, to provide DC power to a load, and can regenerate power to the grid, provide unity power factor or other power factor correction (PFC) operation, and can operate in certain examples with controlled current distortion, such as <5% according to IEEE standards. AFE converters can be used in motor-drive applications where the DC output of the converter is connected to multiple inverters or to one inverter controlling one or more operating parameters of a driven motor load, such as speed and/or torque. In various implementations, AFE converters can be used in grid tie applications where the DC side is connected to DC supply such as a fuel cell, a solar cell, etc. In other implementations, the DC output of an AFE converter can be connected to a DC power storage circuit or system, such as an inverter that powers a motor driven flywheel, an external DC storage capacitor, etc. In certain examples, AFE converters include an internal DC bus capacitor that can be used to store DC power. Internal or external DC power storage components or systems facilitate operation in systems having servo drives or other loads that alternate between motoring operation where power flows out of the AFE converter output, and regenerating operation where power flows into the AFE converter.

AFE converters can operate in different modes, such as a first mode to control or regulate a DC bus voltage at the converter DC output. The regulation in one example facilitates efficient operation with the DC bus voltage adjusted to be higher than the peak of the input line voltage, for example, by 2%. In a second mode, the AFE converter can be operated manually, for example, according to a user setting is a regulating setpoint for the DC bus voltage. AFE converters can also implement droop control, for example, where the DC bus voltage is regulated or controlled to allow parallel operation of multiple AFE converters connected to a shared DC bus. AFE converters can also implement power factor correction or volt-amps-reactive (Var) control, in which the DC bus voltage is regulated according to a reactive power command input.

Control techniques, controllers, and power converters with active rectifiers are described herein, which facilitate efficient, compact, low cost operation in connection with servos or other loads that alternate between motoring operation and regenerating operation with corresponding changes in a direction of power flow at the DC output of an AFE converter. In one example, a power converter includes an AC input, DC output, a switching circuit, and a controller configured to selectively regulate a DC bus voltage between first and second voltage limits and limit the power at the DC output according to the DC bus voltage. Disclosed examples facilitate size and cost reduction in active rectifiers circuitry and can be used in conjunction with auxiliary DC power storage circuits or systems, such as motor driven flywheels, external storage capacitors, or a DC bus capacitance of the power converter itself. Certain examples of the active rectifier controller selectively implement dynamic bus control concepts for DC bus voltage regulation in conjunction with power limit control to advantageously facilitate harvesting of regenerative power using the DC power storage facilities, while driving a servo control system or other load that alternates between motoring and regenerating operation.

In one example, the controller includes a modulation index controller to compute a modulation index according to a bus control input, a modulator to generate the switching control signals according to the modulation index to cause the switching circuit to control a DC bus voltage at the DC output, and a dynamic bus controller to generate the bus control input according to the DC bus voltage at the DC output, a direction of power flow at the DC output, and a power at the DC output. In one implementation, the dynamic bus controller includes a voltage regulator to selectively regulate the DC bus voltage between first and second voltage limits and a power limiter's to limit the power at the DC output according to the DC bus voltage. In another example, the controller controls a DC bus voltage between first and second regenerating voltage limits and limits power at the DC output in an increasing fashion with increasing values of the DC bus voltage according to a regenerating power limit parameter for a regenerating direction of power flow at a DC output. For a motoring direction of the DC output power, the controller controls the DC bus voltage at the DC output between first and second motoring voltage limits and limits the power at the DC output in a decreasing fashion with increasing values of the DC bus voltage according to a motoring power limit parameter.

In one example, the controller implements linear power limiting control, by limiting the power at the DC output at a selected one of an integer number N constant regenerating power limit values in each respective one of N ranges of the DC bus voltage, where N is greater than 1 for a regenerating direction of power flow at the DC output, and by limiting the power at the DC output at a selected one of an integer number N constant motoring power limit values in each respective one of the N ranges of the DC bus voltage for a motoring direction of power flow at the DC output. Second or higher order piecewise linear control can be used, for example, where N is greater than 2.

In another example, the controller implements nonlinear power limiting control. In one implementation, the controller limits the power at the DC output at a value computed according to a first non-linear function of the DC bus voltage for a regenerating direction of power flow at the DC output, and limits the power at the DC output at a value computed according to a second non-linear function of the DC bus voltage for a motoring direction of power flow at the DC output. Any order nonlinear control formulas can be used, such as second order or first and second non-linear functions of an order greater than 2.

Referring initially to FIGS. 1-4, an example power conversion system 100 in FIG. 1 includes a motor drive 102 that implements a linear example of dynamic bus control (DBC) that dynamically changes motoring and regenerating power limits and stops according to the DC bus voltage in the direction of power flow at the DC output. FIG. 1 shows an example industrial power conversion system 100 with a motor drive power converter 102 that receives and converts AC electrical input power in a motoring mode from a source 104 to drive a motor load 106 through a motor cable 108 having a cable length 110. The AC input and output of the converter 102 are three phase configurations in the illustrated examples. Other implementations are possible using any combination of single or multiphase inputs and outputs to drive the motor 106 or other type of load. In motoring operation, the motor drive 102 receives single or multiphase AC input power from the grid or other AC power source 104 and converts this to a DC bus voltage using an active front end (AFE) rectifier 114 which provides a DC output voltage VDC to a DC bus circuit 116 having a DC output with first and second DC terminals labeled DC+ and DC−, and one or more DC bus capacitors CDC connected between the DC+ and DC− terminals. The example power conversion system 102 in FIG. 1 is a voltage source converter (VSC) motor drive, which includes an input filter 112 between the source 104 and the active rectifier 114, as well as the DC bus circuit 116 with the DC bus capacitor CDC, an inverter 118 with inverter switches S1-S6, an inverter output 119 (e.g., output phase lines 119U, 119V and 119 W), an output filter circuit (e.g., filter) 120 with output terminals 121U, 121V and 121 W, and a controller or control circuit 122.

The example AC power source 104 provides AC phase voltage signals Ea, Eb and Ec to the inputs of the input filter 112, and the filter 112 provides filtered AC input voltage signals Va, Vb and Vc to the respective phase input lines A, B and C of the active rectifier 114. The active rectifier 114 includes rectifier switching devices RS1, RS2, RS3, RS4, RS5 and RS6 (e.g., IGBTs, etc.) operated according to rectifier switching control signals from the controller 122 via a driver circuit 115 to convert input AC electrical power to provide the DC bus voltage in the DC bus circuit 116. The illustrated motor drive 102 is a voltage source converter configuration including one or more capacitive storage elements in the DC bus circuit 116. The DC bus circuit 116 may include a single capacitor CDC or multiple capacitors connected in any suitable series, parallel and/or series/parallel configuration to provide a DC bus capacitance across the inverter input terminals. The system 100 of FIG. 1 also includes an external DC storage circuit 160, for example, an external storage capacitor connected to the DC bus lines DC+ and DC−.

The controller 122 includes an inverter controller 128 that provides inverter switching control signals to operate the switches S1-S6 of the inverter 118 to regulate or control one or more of voltage, current, speed, torque, etc. The controller 122 in certain embodiments implements a motor speed and/or position and/or torque control scheme in which the controller 122 selectively provides the switching control signals to the inverter switches S1-S6 in a closed and/or open-loop fashion according to one or more setpoint values such as a motor speed setpoint. The setpoint in one example is a signal or value generated by the controller 122, or a fixed setpoint value, or such setpoint value can be received from an external system (not shown). In practice, the motor drive 102 may also receive a torque setpoint and/or a position (e.g., angle) setpoint, and such desired signals or values (setpoint(s)) may be received from a user interface and/or from an external device such as a distributed control system, etc. (not shown). As used herein, a signal can be an analog signal, such as a current or a voltage signal, or a signal can include digital values generated or consumed by the controller 122.

The controller 122 also includes a rectifier controller 130 with a processor 131 and an associated electronic memory 132 which stores program instructions to implement a closed loop control program to regulate or control real and reactive current of the rectifier 114 as well as a DC bus voltage VDC of the DC output DC+, DC− across the DC bus capacitor CDC of the DC bus circuit 116 and any connected external storage capacitor 160. In particular, the controller 122 can operate the active rectifier 114 for motoring and/or regeneration operation. In various implementation examples, the rectifier 114 can charge the DC bus capacitor CDC to regulate or maintain a DC bus voltage VDC according to any suitable setpoint and feedback signals or values, as well as regenerate power to the source 104 (e.g., a power grid) or to the external storage capacitor 160. The rectifier controller 130 in certain examples can provide unity power factor or other regulated power factor correction (PFC) control, and certain examples provide low current distortion (e.g., less than 5% according to IEEE standards). In various implementations, the active front and rectifier 114 can be used in combination with a single inverter to drive a motor (e.g., the illustrated inverter 118 to drive the motor load 106), or in other motor-drive applications where the DC bus circuit 116 is connected to multiple inverters (not shown). In one example, the rectifier 114 is used in a grid tie application where the DC bus circuit 116 is connected to a bus supply circuit, such as a fuel cell, a photovoltaic system with one or more solar cells, etc. (not shown).

In one example, the memory 132 of the rectifier controller 130 includes program instructions executable by the processor 131 to implement various control components for operating the active rectifier 114, including a voltage regulator component 134 (herein a voltage regulator) and a power limit component 140 (hereinafter a power limiter). Certain examples use a modulation index (MI) control parameter in the controller 130 to operate the active rectifier 114. The AC output voltage provided by the inverter 118 in motoring operation may depend on the DC bus voltage VDC and the inverter control modulation index. The rectifier controller 130 implements modulation index control in one example that provides closed loop regulation of the DC bus voltage VDC at the DC output, in combination with selective power limiting to allow the system to accommodate reduced rectifier size and cost while supporting servo or other applications in an efficient manner to harvest regenerative energy from the load motor 106 and store most or all regenerative current into the bus capacitor CDC and/or any connected external storage circuit 160. The disclosed examples provide a selective and flexible DC bus voltage control according to the DC bus voltage VDC at the DC output, the direction of power flow at the DC output, and the power P at the DC output of the rectifier 114.

In the illustrated rectifier 114, the AC input includes AC nodes A, B and C, and the rectifier DC output includes first and second DC nodes labeled DC+ and DC− in FIG. 1. The rectifier switching devices RS1-RS6 are coupled with the AC input and with the DC output, and individually operate to selectively couple a corresponding one of the AC nodes with a respective one of the first and second DC nodes according to a respective switching control signal from the rectifier controller 130. The controller 130 includes a modulation index (MI) controller 138 that computes a modulation index according to a bus control input and provides one or more control signals or values to a modulator 133, such as a pulse width modulation (PWM) circuit. The modulator 133 generates the rectifier switching control signals to selectively operate the switches RS1-RS6 according to the modulation index to cause the switching circuit to control the DC bus voltage VDC at the DC output of the rectifier 114. The rectifier controller 130 also includes a dynamic bus controller 150 that provides the bus control input to the modulation index controller 138 according to the DC bus voltage VDC at the DC output, the direction of power flow at the DC output, and the power P at the DC output.

Figure 2:
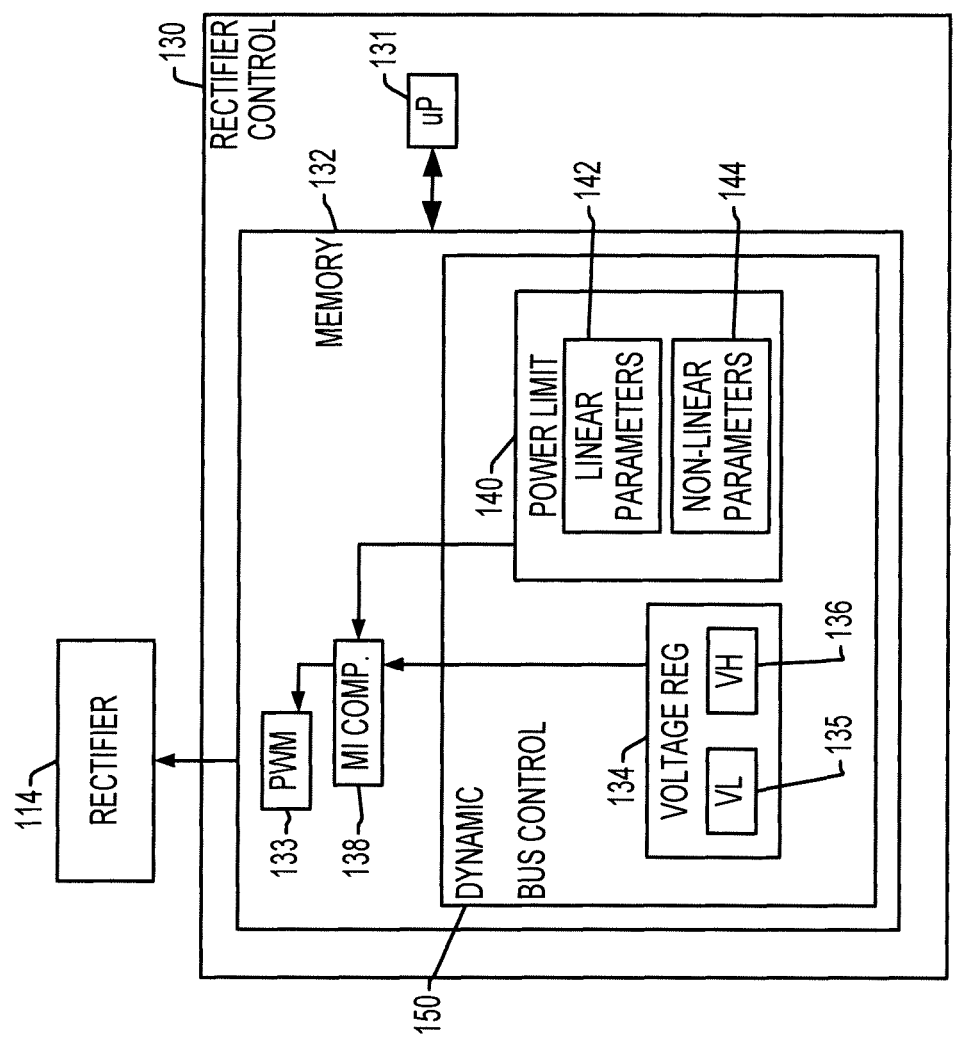
FIG. 2 is a schematic diagram of further details of an example dynamic bus controller in the power converter of FIG. 1.

As further shown in FIG. 2, the dynamic bus controller 150 in one example includes a voltage regulator 134 that selectively regulates the DC bus voltage VDC between first and second (e.g., low and high) voltage limits VL and VH labeled 135 and 36 in FIG. 2. The dynamic bus controller 150 also includes a power limiter 140 that limits the power P at the DC output according to the DC bus voltage VDC. In one example, the power limiter 140 includes one or more linear power limit parameters 142. In another example, the power limiter 140 includes one or more nonlinear power limit parameters 144. In operation in one example, the dynamic bus controller 150 limits the power P at the DC output in an increasing fashion with increasing values of the DC bus voltage VDC for the regenerating direction of power flow at the DC output (REGEN), and for a motoring direction of power flow at the DC output (MOTORING), the dynamic bus controller 150 limits the power P at the DC output in a decreasing fashion with increasing values of the DC bus voltage VDC.

Figure 3:
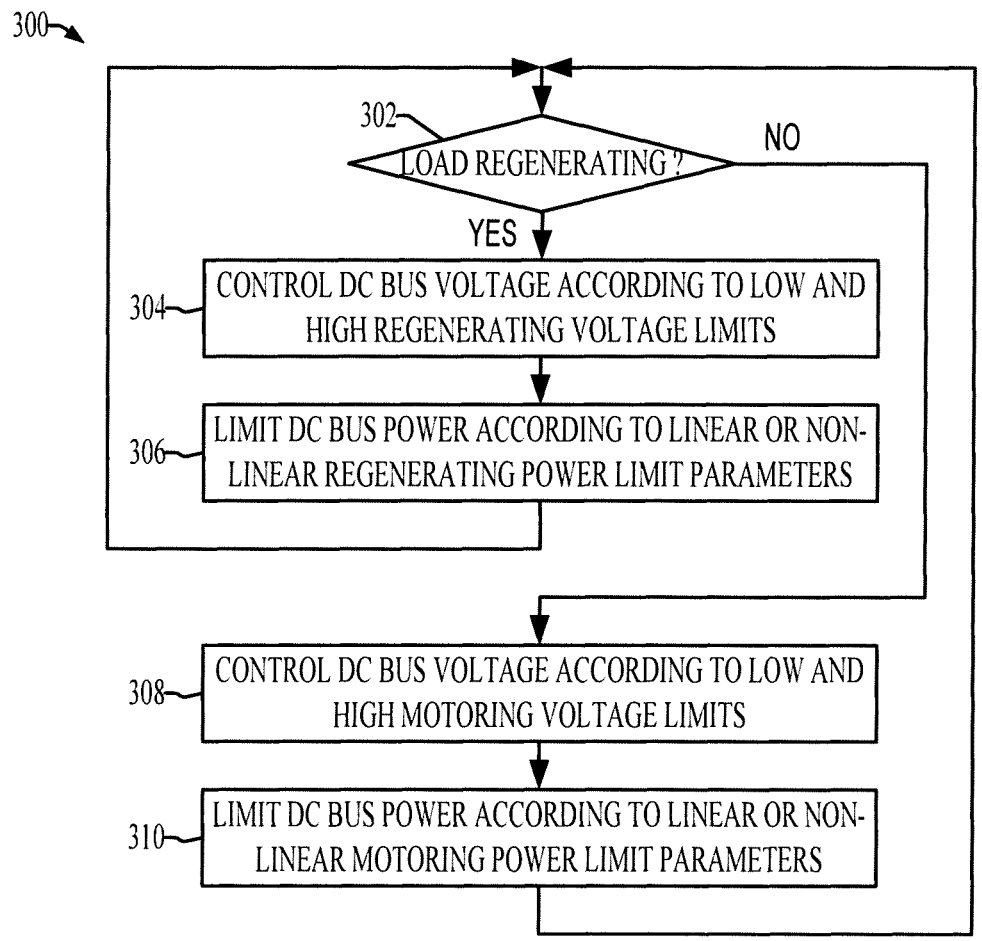
FIG. 3 is a flow diagram of a method for operating a power converter.
Figure 4:
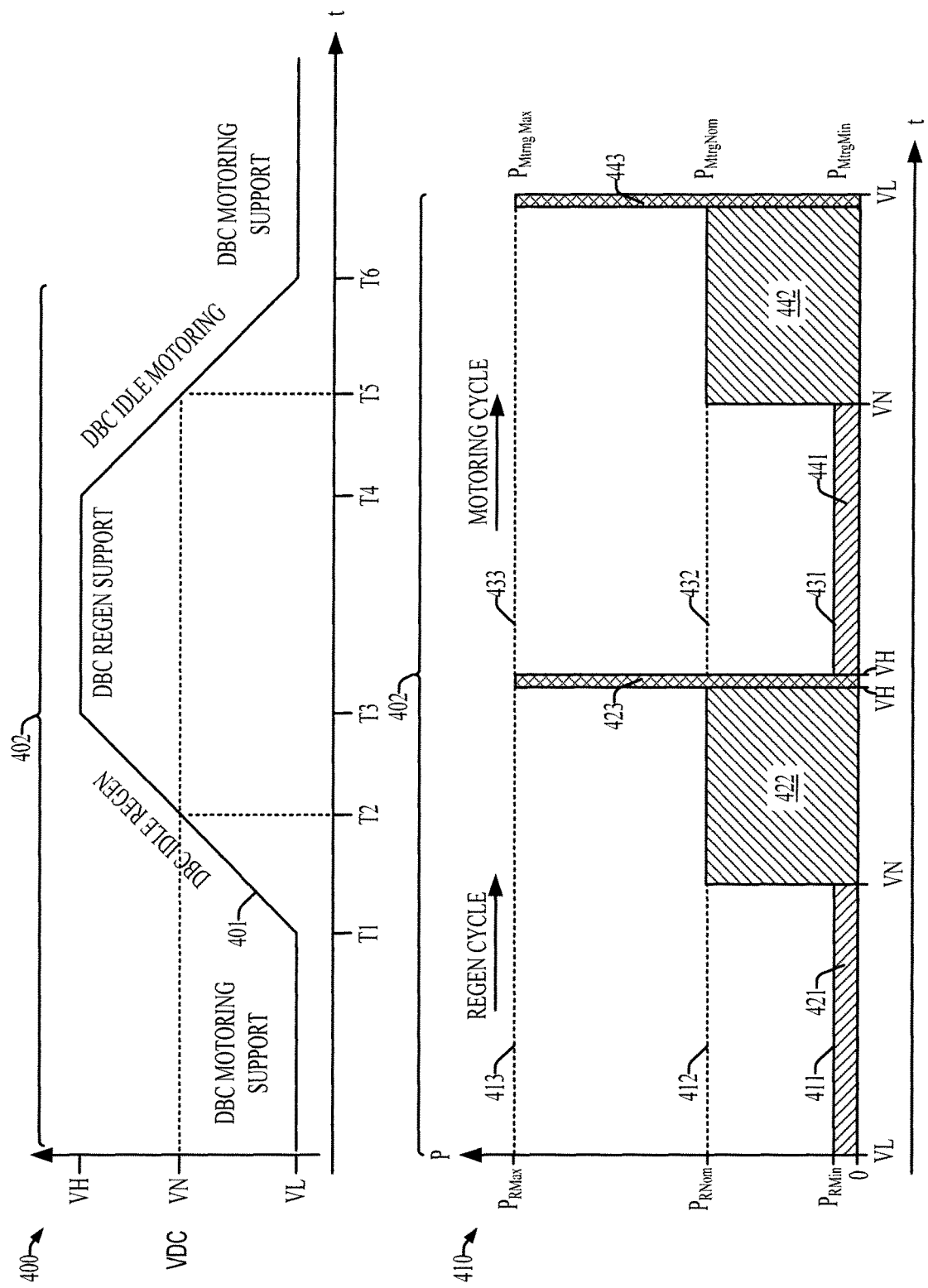
FIG. 4 is a signal diagram showing alternate motoring and regenerating operation of the power converter and linear power limit control in one implementation of the power converter of FIGS. 1 and 2.
Figure 5:
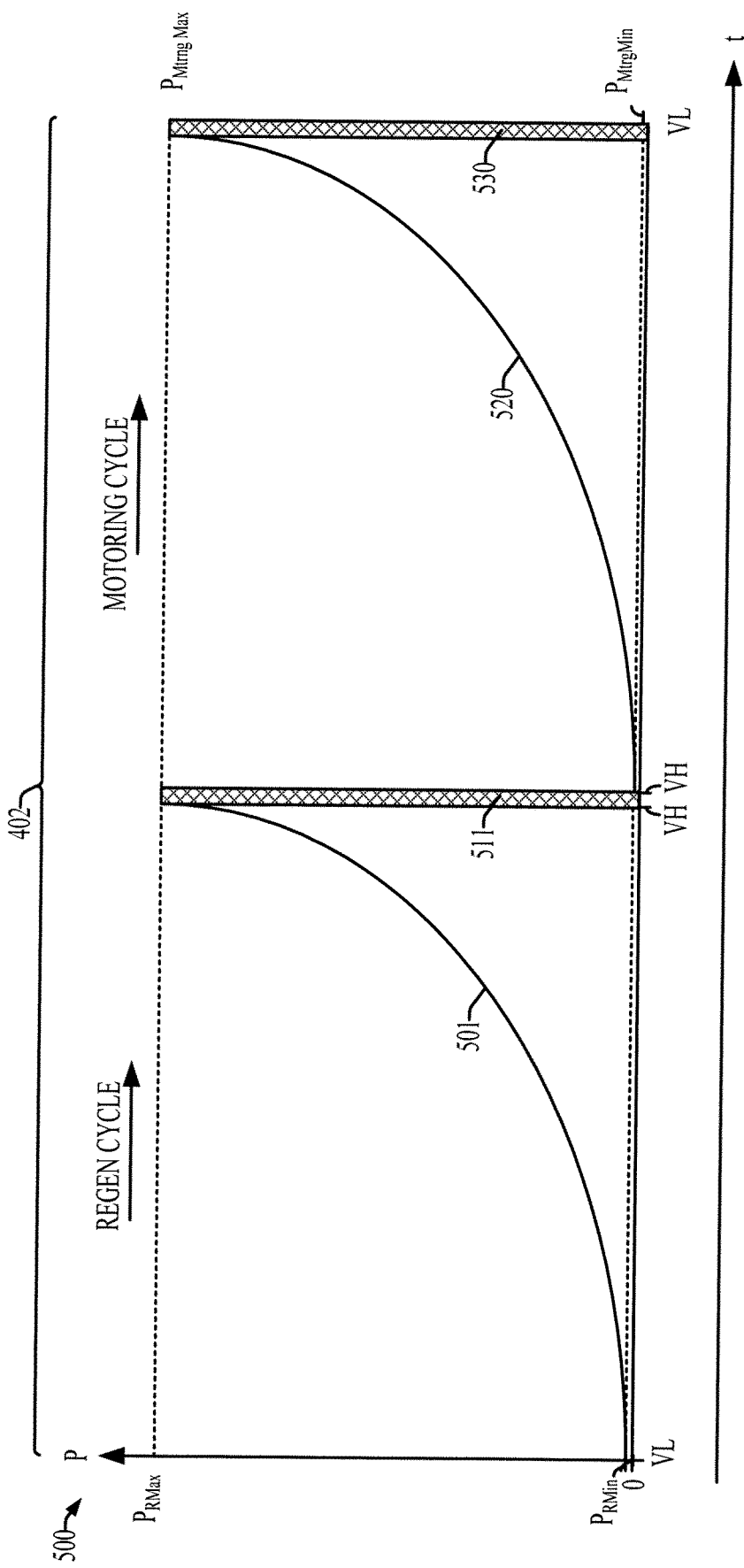
FIG. 5 is a signal diagram showing an example of nonlinear power limit control in another implementation of the power converter of FIGS. 1 and 2.

Referring also to FIGS. 3-5, according to further aspects FIG. 3 shows a method 300 for operating a power converter and is described hereinafter in association with operation of the rectifier controller 130 in FIGS. 1 and 2. In one implementation, the method includes controlling a DC bus voltage at the DC output between first and second regenerating voltage limits, and limiting power at the DC output according to a regenerating power limit parameter for a motoring direction of power flow at the DC output, as well as controlling the DC bus voltage at the DC output between first and second motoring voltage limits and limiting power at the DC output according to a motoring power limit parameter for a regenerating direction of power flow at a DC output. In one example, the method includes limiting the power at the DC output at a selected one of an integer number N constant regenerating power limit values in each respective one of N ranges of the DC bus voltage, where N is greater than 1 for the regenerating direction of power flow at the DC output, and limiting the power at the DC output at a selected one of an integer number N constant motoring power limit values in each respective one of the N ranges of the DC bus voltage for the motoring direction of power flow at the DC output. In certain examples, the method includes limiting the power at the DC output at a value computed according to a first non-linear function of the DC bus voltage for the regenerating direction of power flow at the DC output, and limiting the power at the DC output at a value computed according to a second non-linear function of the DC bus voltage for the motoring direction of power flow at the DC output. In certain examples, the method includes limiting the power at the DC output in an increasing fashion with increasing values of the DC bus voltage for the regenerating direction of power flow at the DC output, and limiting the power at the DC output in a decreasing fashion with increasing values of the DC bus voltage for the motoring direction of power flow at the DC output.

In a further aspect, a non-transitory computer readable medium includes computer executable instructions, which, when executed by a processor, cause the processor to control a DC bus voltage at the DC output between first and second regenerating voltage limits and limit power at the DC output according to a regenerating power limit parameter for a regenerating direction of power flow at a DC output of a rectifier, and to control the DC bus voltage at the DC output between first and second motoring voltage limits and limit power at the DC output according to a motoring power limit parameter for a motoring direction of power flow at the DC output. In one example, the non-transitory computer readable medium has computer executable instructions, which, when executed by a processor, cause the processor to limit the power at the DC output at a selected one of an integer number N constant regenerating power limit values in each respective one of N ranges of the DC bus voltage for the regenerating direction of power flow at the DC output, where N is greater than 1, and to limit the power at the DC output at a selected one of an integer number N constant motoring power limit values in each respective one of the N ranges of the DC bus voltage for the motoring direction of power flow at the DC output. In certain examples, the non-transitory computer readable medium has computer executable instructions, which, when executed by a processor, cause the processor to limit the power at the DC output at a value computed according to a first non-linear function of the DC bus voltage for the regenerating direction of power flow at the DC output, and to limit the power at the DC output at a value computed according to a second non-linear function of the DC bus voltage for the motoring direction of power flow at the DC output.

The method 300 in FIG. 3 includes determining whether the motor load 106 is motoring or regenerating in each of a continuous series of rectifier control cycles. For a regenerating direction of power flow at the DC output (REGEN, YES at 302), the DC bus voltage VDC at the DC output is controlled (e.g., regulated) at 304 at or between the first and second regenerating voltage limits VH, VL, and the power P at the DC output is limited at 306 according to a regenerating power limit parameter. Otherwise, for a motoring direction of power flow at the DC output (MOTORING, NO at 302), the method 300 includes controlling 308 the DC bus voltage VDC at 308 between first and second motoring voltage limits (e.g., VH, VL), and limiting the power P at the DC output according to a motoring power limit parameter at 310.

FIG. 4 illustrates one example implementation of the method 300 using DC bus voltage regulation at or between the voltage limits VH and VL with linear power limiting. In this example, the power limiting him up for regenerating operation at 306 includes limiting the power P at the DC output at a selected one of an integer number N constant regenerating power limit values $P_{RMin}$, $P_{RNom}$, $P_{RMax}$ (linear power limit parameters 142 and FIG. 2) in each respective one of N ranges of the DC bus voltage VDC, where N is greater than 1, and for the motoring direction of power flow at the DC output MOTORING, limiting 310 the power P at a selected one of N constant motoring power limit values $P_{MtrMin}$, $P_{MtrNom}$, $P_{MtrMax}$ in each respective one of the N ranges of the DC bus voltage VDC at or between VH and VL. In this example, moreover, the power limiting for the regenerating direction of power flow is performed is performed in an increasing fashion with increasing values of the DC bus voltage VDC, and for the motoring direction of power flow, in a decreasing fashion with increasing values of the DC bus voltage VDC. In the illustrated example, successive ones of the regenerating power limit values $P_{RMin}$, $P_{RNom}$ and $P_{RMax}$ increase with increasing ranges of the DC bus voltage VDC, whereas successive ones of the motoring power limit values $P_{MtrMin}$, $P_{MtrNom}$ and $P_{MtrMax}$ decrease with increasing ranges of the DC bus voltage VDC.

FIG. 4 includes a graph 400 with a curve 401 showing the DC bus voltage VDC as a function of time through portions of example alternating regenerating and motoring operation cycle 402 in the converter 102 of FIGS. 1 and 2. A graph 410 in FIG. 4 shows an example linear power limiting implemented by the power limiter 140, where N=3 as a function of time through an example regenerating cycle and an example motoring cycle. The curve for a one begins in a DC motoring support phase, with the voltage regulator 130 for regulating the DC bus voltage to the lower limit VL (e.g., 700 V DC in one example). In the initial portion of the graph 400, the mechanical load is consuming motoring power from the DC output of the rectifier 114. The DC bus voltage is at DC the lower limit VL, and the converter in one example supplies the maximum power ($P_{MtrMax}$ in the graph 410) to ensure the DC bus voltage will not go below that limit. Regenerating direction power flow at the DC output begins at time T1 in the graph 400, and the voltage regulator 134 regulates the DC bus voltage in an increasing fashion. During this portion, the graph 410 shows the power P at the DC output of the rectifier 114. In this example, as the power direction changes from motoring to regenerating, the DC bus voltage VDC is higher than VL but lower than the nominal value VIN. The power converter in this example is in an idle mode, in which almost no regenerating or motoring power is supplied by the converter, where one implementation allows a user to set a default, such as 5%. In this mode, moreover, regenerating power from the mechanical system (e.g., the motor load 106 and FIG. 1) is stored in the DC bus capacitors CDC, 160 to allow the buildup of the DC bus voltage.

The power limiting operation in this example is piecewise linear, including regions defined by minimum, nominal and maximum power limits for each of the regenerating and motoring cycles. The example of FIG. 4 uses the upper and lower DC bus voltage limits VH and VL, respectively, as well as a nominal DC bus voltage parameter VN, each of which is stored as a linear parameter 142 in the memory 132 as shown in FIG. 2. For a regenerating direction of power flow at the DC output, the power limiter 140 limits the power P at the DC output at a selected one of an integer number N constant regenerating power limit values $P_{RMin}$, $P_{RNom}$ and $P_{RMax}$ in each respective one of N ranges of the DC bus voltage VDC. The linear implementation of FIG. 4 uses a minimum regenerating power limit value 411 ($P_{RMin}$) that defines a first power limit region 421 for DC bus voltages between VL and VN, a nominal regenerating power limit value 412 ($P_{RNom}$) that defines a second power limit region 422 for DC bus voltages between VN and VH, as well as a maximum regenerating power limit value 413 ($P_{RMax}$) that defines a third regenerating power limit region 423 for operation at VH.

The power limiter 140 is configured to implement power limiting for motoring direction of power flow at the DC output, including limiting the power P at a selected one of an integer number N constant motoring power limit values $P_{MtrMin}$, $P_{MtrNom}$, $P_{MtrMax}$ in each respective one of the N ranges of the DC bus voltage VDC. For motoring operation, the three-level piecewise linear example in FIG. 4 includes a minimum motoring power limit value 431 ($P_{MtrMin}$) that defines a first power limit region 441 for DC bus voltages between VH and VN, a nominal motoring power limit value 432 ($P_{MtrNom}$) that defines a second power limit region 442 for DC bus voltages between VN and VL, and a maximum motoring power limit value 433 ($P_{MtrMax}$) that defines a third motoring power limit region 443 for operation at VL. In the illustrated example, the minimum, nominal and maximum power limits are the same for regenerating and motoring cycles (e.g., $P_{RMin}=P_{MtrMin}$; $P_{RNom}=P_{MtrNom}$; and $P_{RMax}=P_{MtrMax}$), although not a strict requirement of all possible implementations.

As seen in the graph 400 of FIG. 4, the regenerating operation begins at time T1, with the voltage regulator 134 increasing the DC bus voltage (DBC IDLE REGEN portion of curve 401 in the graph 400). The DC bus voltage increases from the lower limit VL between T1 and T2, with the power limiter 140 limiting the DC output power to the first regenerating power limit $P_{RMin}$. The DC bus voltage reaches the nominal voltage value VN at time T2. At this point, the power limiter 140 changes the power limit operation to the second (e.g., nominal) regenerating power limit $P_{RNom}$, and limits the DC output power at this value from T2 until T3, at which point the DC bus voltage reaches the upper limit VH (e.g., 790 V DC) and the power limiter 140 changes the power limit to the upper regenerating limit $P_{RMax}$. The rectifier controller 130 then operates the rectifier 114 in a DBC REGEN SUPPORT portion of the curve 401 at or near the upper DC bus voltage limit VH until the time T4 with the power limiter 140 limiting the power at the upper regenerating limit $P_{RMax}$, at which the power direction at the DC output changes to motoring operation. In this phase, the DC bus voltage is regulated at the upper limit VH, and the rectifier 114 can regenerate any extra energy back to the line 104 in order to maintain the DC bus voltage VDC at or near VH. The DC bus voltage VDC is decreased after T4, reaching the nominal value VN at time T5, and the downward ramp continues until time T6, at which DBC motoring support is resumed as described above. During the DBC IDLE MOTORING portion of the curve 401, the dynamic bus controller 150 changes from regenerating to motoring mode, and the converter 102 does not provide motoring power from the AC input source 104 to the system, in order to achieve maximum utilization of the stored energy in the DC capacitor bank CDC, 160 until the DC bus reaches VN at T5.

This operation for regenerating power from the load 106 preferentially facilitates regenerative energy transferred to the DC bus capacitor CDC and/or to the external storage capacitor 160 in FIG. 1, instead of regenerating all the energy back to the power source 104 (e.g., to a power grid), thereby enhancing the efficiency of the power conversion system. For example, if the DC bus voltage begins a regenerating cycle at a relatively low value, it is desired to harvest regenerative energy to the storage capacitor CDC and/or 160. The described dynamic bus control component 150, moreover, concurrently regulates the DC bus voltage value (e.g., during the IDLE REGEN portion of the curve 401) to mitigate or avoid over voltage trip conditions in the power converter 102. In order to continue preferential regeneration to the DC bus capacitor CDC and/or to the external storage capacitor 160, moreover, the power limiter 140 in this example limits the power to the maximum regenerating limit $P_R$ w, from T3 to T4, while the voltage regulator 134 prevents the DC bus voltage VDC from exceeding VH in order to avoid or mitigate voltage trips in the converter 102. In one example, the upper DC bus voltage regulating point VH is set below a voltage trips setting for the motor drive 102. In one example, the voltage regulating linear parameters (VH, VN, VL) can be set by a user. In one example, the linear power limit parameters 142 can also be configured by a user. In this manner, the dynamic bus control component 150 advantageously facilitate storing as much energy as possible in one or both of the DC bus capacitor CDC and/or the external storage capacitor 160, which can then be used to drive the motor load 106 and a subsequent motoring cycle, thereby enhancing the efficiency of the converter 102.

The rectifier controller 130 in certain examples also implements other control modes, such as an automatic mode in which a DC bus voltage reference is tailored for efficient operation of the drive, a manual mode in which the DC bus voltage is regulated to a user defined setpoint, a droop control mode to facilitate use of the rectifier 114 in parallel with another active rectifier (not shown), as well as a Var control mode to control the DC bus voltage according to a reactive power command, for example, for power factor correction applications. The DBC mode in one example controls a DC bus voltage reference, motoring power limit, and regenerating power limit to facilitate efficient utilization of the mechanical load kinetic energy based on the load cycle and to minimize or reduce the size of the AFE power converter 114 with respect to the load 106. One possible application is a servo press application, where the system operating condition frequently alternates between motoring and regeneration.

The active power consumed by the motoring cycle in one possible implementation relies mainly on the energy stored in the external capacitor 160, while in the regenerating part of the cycle, the kinetic energy of the mechanical system is converted to electrical energy through the electromechanical system and this energy is stored back in the external capacitor 160, and the alternating motoring/regenerating operation can continue through many alternating cycles for efficient system operation. This conserves system energy while providing low motoring/regen power to support the system without overvoltage trips and optimizes the regenerated power to maximize the energy stored in the external capacitor 160 and minimize converter size with respect to the load. The linear example of FIG. 4 provides 3 levels of power limiting as a function of the DC bus voltage. In this example, the nominal DC bus voltage value VN can be chosen to change the motor/regen power limit based on power flow. If VN is set to VL or VH, the 3-level linear DBC control is reduced to 2-level linear DBC control. The piecewise linear concept can be extended to multiple (e.g., N) points such that a power limit can be selected based on multiple nominal voltage values $VN_1$, $VN_2$, . . . , $VN_N$. Where N is a positive integer greater than or equal to 2 to provide N-level linear DBC control.

In the linear DBC control example of FIG. 4, the regenerating/motoring power limit is changed in linear steps depending on the DC bus voltage VDC, for example, to maximize the energy stored in the DC bus capacitors CDC/160 and to minimize the energy consumption/regeneration to the line 104. Ideally, the main function of the power conversion system is to supplement the losses in the system. The 3-level example of FIG. 4 regulates the DC bus voltage VDC between the lower limit VL and the upper limit VN and includes three steps where VN is a middle point between VL and VH, although not a strict requirement of all possible implementations. The equations below illustrate operation of the example 3-level linear DBC control implementation of FIG. 4.

$$\Delta V_{RLNom}=V_{Nom}-V_L \tag{1}$$

$$\Delta V_{RNomH}=V_H-V_{Nom} \tag{2}$$

$$P_{RLim}=P_{RMin} V_L<V<V_{Nom}$$

$$P_{RLim}=P_{RNom} V_{Nom}<V<V_H \tag{3}$$

Where $P_{RMin}$ the power is limit setting when $V_L<V<V_{Nom}$ and $P_{RNom}$ is the power limit setting when $V_{Nom}<V<V_H$.

In general, the energy E can be calculated from power integration with respect to time according to the following equation (4):

$$E = \int P(\Delta t) \qquad (4)$$

Assuming the rate of rise of the voltage with respect to "t" is k where k is defined as follows:

$$k = \frac{V_H - V_L}{\Delta t} = \frac{\Delta V_R}{\Delta t} \qquad (5)$$

Therefor, $\Delta t = \frac{\Delta V_R}{k}$ (6)

$$E = \int P \frac{\Delta V_R}{k} = \frac{1}{k} \int P \Delta V_R$$

The maximum energy allowed to be generated to the source during the regen cycle where the bus varies from $V_L$ to $V_H$:

$$E_{Reg} = \frac{1}{k_{Reg}} \int_0^1 P_{RLim} d(\Delta v) \qquad (7)$$

$$= \frac{1}{k_{Reg}} \left( \int_0^{\Delta V_{RLNom}} P_{RMin} d(\Delta v) + \int_0^{\Delta V_{RNomH}} P_{RNom} d(\Delta v) \right)$$

$$= \frac{1}{k_{Reg}} ((\Delta V_{RLNom}) P_{RMin} + (\Delta V_{RNomH}) P_{RNom})$$

The maximum energy allowed to be consumed from the source during the motoring cycle where the bus varies from $V_H$ to $V_L$:

$$E_{Mtrng} = \frac{1}{k_{Mtrng}} ((\Delta V_{RLNom}) P_{MNom} + (\Delta V_{RNomH}) P_{MMin}) \qquad (8)$$

Assuming $P_{RMin} \approx 0$, then $E_{Reg} = \frac{1}{k_{Reg}} (\Delta V_{RNomH}) P_{RNom}$, the maximum energy allowed to be generated to/consumed from the source during the regen/motoring cycle where the bus varies from $V_H$ to $V_L$ and vice versa.

The two-level dynamic bus control is a special case of the 3 level, if $V_{Nom} = V_L$, equations (7) and (8) will be as follows:

$$E_{Reg} = \frac{1}{k_{Reg}} ((\Delta V_{RNomH}) P_{RNom}) \qquad (9)$$

$$E_{Mtrng} = \frac{1}{k_{Mtrng}} ((\Delta V_{RLNom}) P_{RNom}) \qquad (10)$$

Figure 6:
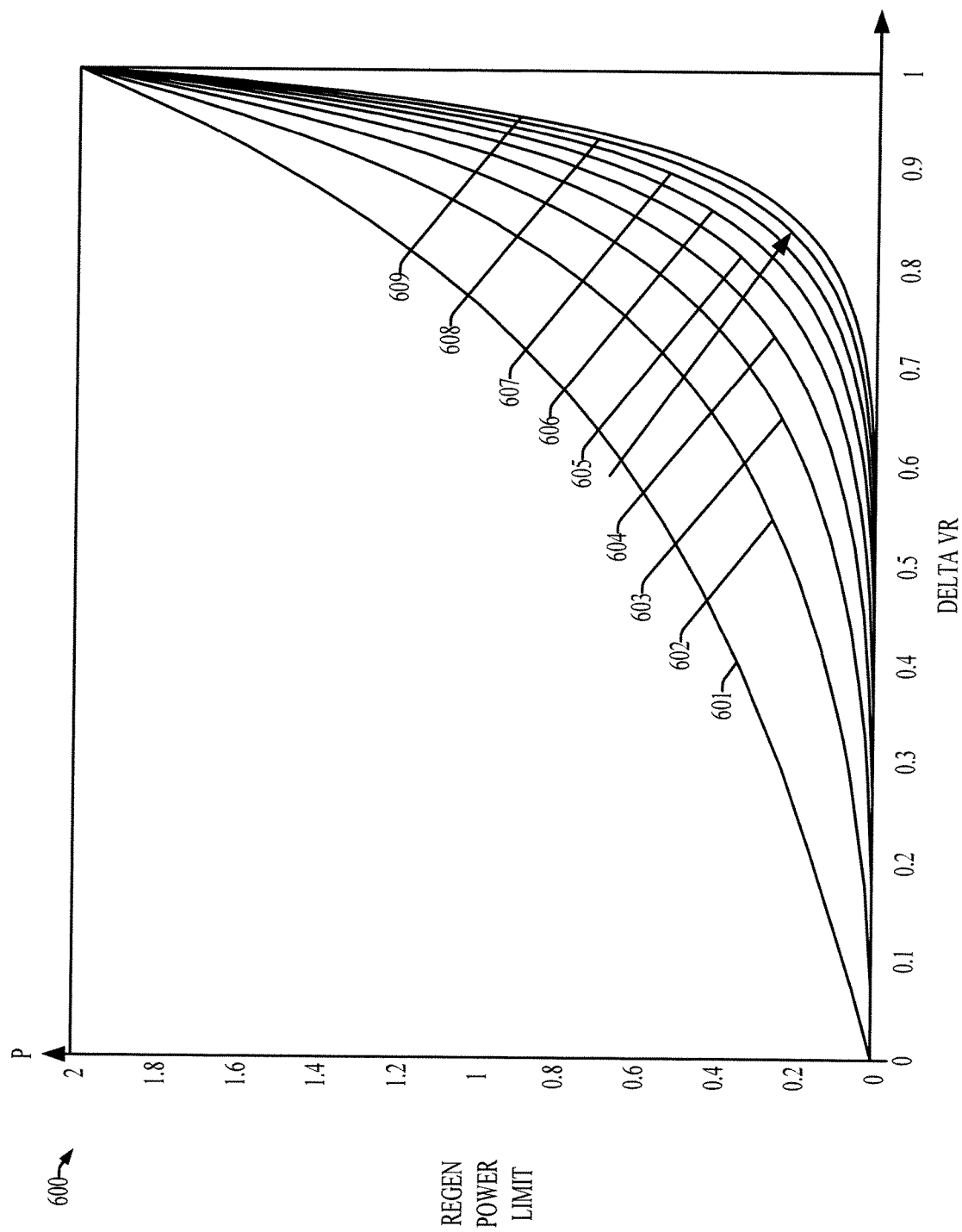
FIG. 6 is a graph showing the power limit values for different orders of nonlinear power limit control.

FIGS. 5 and 6 illustrate an example non-linear implementation of the dynamic bus control method 300, which can be employed in the power converter of FIGS. 1 and 2. In this example, the power limiter 140 limits the power P at the DC output at a value computed according to a first non-linear function of the DC bus voltage VDC for the regenerating direction of power flow at the DC output REGEN, and for a motoring direction of power flow at the DC output MOTORING, limits the power P at the DC output at a value computed according to a second non-linear function of the DC bus voltage VDC. In addition, in one example, the power limiter 140 implements a first non-linear function for regenerating operation that increases with increasing values of the DC bus voltage VDC and implements the second non-linear function that decreases with increasing values of the DC bus voltage VDC for motoring operation. In certain examples, the first and second non-linear functions are of an order greater than 2. In the illustrated examples, the non-linear approach again limits the power P at the DC output (e.g., at 306 and FIG. 3) in an increasing fashion with increasing values of the DC bus voltage VDC for regenerating operation, and limits the power P in a decreasing fashion with increasing values of the DC bus voltage VDC (e.g., at 310 in FIG. 3) for the motoring direction of power flow at the DC output.

FIG. 5 shows a graph 500, including a power limit curve 501 for a regenerating cycle portion of the alternating cycle 402, which varies non-linearly from a minimum value $P_{RMin}$ to a maximum value $P_{RMax}$ between the lower DC bus voltage value VL to the upper DC bus voltage value VH. From VL to VH, the power limiter 140 limits the DC output power to the limits set by the curve 501. When the DC bus voltage reaches the upper limit VH, the power limiter 140 limits the power to the maximum value in a region 511, as the system transitions from regenerating to motoring operation. During motoring operation, the power limiter 140 begins to control the DC output power according to a limit set by a second curve 520 in FIG. 5, which varies from a minimum value $P_{MtrMin}$ to a maximum value $P_{MtrMax}$ between the upper DC bus voltage value VH and the lower DC bus voltage value VL. When the DC bus voltage returns to VL, the power limiter 140 again limits the power at the maximum value in a region 530 of FIG. 5 until the system operation returns to regenerating operation. The non-linear example can be of any order N, where N is greater than or equal to 2. FIG. 6 shows a graph 600 with example power limiting curves 601, 602, 603, 604, 605, 606, 607, 608, and 609 of successively increasing orders from N=2 for the curve 601 through N=10, with increasing order along the direction of the arrow in FIG. 6.

Like the example linear dynamic bus control examples of FIG. 4, the nonlinear dynamic bus control limitations limit the power based on the actual value of the DC bus voltage. In the example of FIGS. 5 and 6, however, the power is limited in a controlled non-linear fashion as opposed to in steps. This approach can provide smooth and chatter free control. Both the linear and non-linear implementations advantageously minimize the amount of motoring power derived from the line or source 104, while maximizing the amount of motoring power delivered from the DC bus capacitor CDC and/or from the external storage capacitor 160, thereby facilitating efficiency of the overall system. The equations below illustrate operation of the example non-linear DBC control implementation of FIG. 5, in which the power limit is controlled based on the actual value of the DC bus voltage VDC.

The nonlinear curves 501 and 520 in FIG. 5 can be actively adjusted based on the order of the following non-linear equation (11):

$$\Delta V_R = \left( \frac{V - V_L}{V_H - V_L} \right), \qquad (11)$$

Where $\Delta V_R$ is the normalized voltage change during the regenerating cycle, $V_H$ and $V_L$ are the upper and the lower voltage limits:

$$P_{RLim} = \left(\frac{P_{RMax} - P_{RMin}}{e}\right)\left(\Delta V_R^{n-1} e^{\Delta V_R^n}\right) + P_{RMin} \quad (12)$$

Where $P_{RLim}$ the regen power limit as a function of is $\Delta V_R$, $P_{RMax}$ is the maximum allowed regen power and $P_{RMin}$ is the minimum allowed regen power. The nonlinear dynamic bus control can be controlled by using the low voltage limit, high voltage limit, and the order of the equation "n". In equation (12), the power limit can be adjusted based on the parameters $P_{RMax}$, $P_{RMin}$, $V_L$, $V_H$ and n. A family of curves can be created with respected to increasing the value of "n" as shown in FIG. 6. For the motoring cycle, the normalized voltage change can be given by the following equation (13):

$$\Delta V_M = \left(\frac{V_H - V}{V_H - V_L}\right) \quad (13)$$

Therefore, the motoring power limit $P_{MLim}$, as a function of $\Delta V_m$ can be given by the following equation (14):

$$P_{MLim} = \left(\frac{P_{MMax} - P_{MMin}}{e}\right)\left(\Delta V_M^{n-1} e^{\Delta V_M^n}\right) + P_{MMin} \quad (14)$$

Similarly, $P_{MMax}$ is the maximum allowed motoring power and $P_{MMin}$ is the minimum allowed motoring power. In general, the energy can be calculated from power integration with respect to time according to the following equation (15):

$$E = \int P(\Delta t) \quad (15)$$

Assuming a constant rate of rise of the voltage with respect to "t" where k is defined as follows:

$$k = \frac{V - V_L}{\Delta t} = \frac{(V_H - V_L)\Delta V_R}{\Delta t} \quad (16)$$

Therefor, $\Delta t = \frac{(V_H - V_L)\Delta V_R}{k}$, and $\quad (17)$ $$E = \int P \frac{\Delta V_R (V_H - V_L)}{k} = \frac{(V_H - V_L)}{k} \int P \Delta V_R$$

The maximum energy E allowed to be generated to the source during the regenerating cycle where the bus varies from $V_L$ to $V_H$ is given by the following equation (18):

$$E_{Reg} = \frac{(V_H - V_L)}{k_{Reg}} \int_0^1 P_{RLim} d(\Delta v) = \quad (18)$$

$$\left(\frac{(V_H - V_L)}{k_{Reg}}\right)\left(\frac{P_{RMax} - P_{RMin}}{e}\right)\left(\frac{e}{n} - \frac{1}{n}\right) + \left(\frac{(V_H - V_L)}{k_{Reg}}\right) P_{RMin}$$

If $P_{RMin}$ is set to zero, and $P_{RMax}$ is set to $2P_{Rated}$, substituting in (18) yields the following regenerating energy equation (19):

$$E_{Reg} = \left(\frac{(V_H - V_L)}{k_{Reg}}\right)\left(\frac{2P_{Rated}}{e}\right)\left(\frac{e}{n} - \frac{1}{n}\right) \quad (19)$$

Similarly, the maximum energy allowed to be consumed from the source during motoring cycle is given by the following equation (20):

$$E_{Mtrng} = \left(\frac{(V_H - V_L)}{k_{Mtrng}}\right)\int_0^1 P_{MLim} d(\Delta v) = \quad (20)$$

$$\left(\frac{(V_H - V_L)}{k_{Mtrng}}\right)\left(\frac{P_{MMax} - P_{MMin}}{e}\right)\left(\frac{e}{n} - \frac{1}{n}\right) + \left(\frac{(V_H - V_L)}{k_{Mtrng}}\right) P_{MMin}$$

Also, if $P_{MMin}$ is set to zero, and $P_{MMax}$ is set to $2P_{Rated}$, $$E_{Mtrng} = \left(\frac{(V_H - V_L)}{k_{Mtrng}}\right)\left(\frac{2P_{Rated}}{e}\right)\left(\frac{e}{n} - \frac{1}{n}\right) \quad (21)$$

From Equation (7) and (18), if it is adjusted such the maximum generated energy is the same when the voltage is changing from $V_L$ to $V_H$, for regenerating operation:

$$\frac{1}{k_{Reg}}((\Delta V_{RLNom}) P_{RMin} + (\Delta V_{RNomH}) P_{RNom}) = \quad (22)$$

$$\left(\frac{(V_H - V_L)}{k_{Reg}}\right)\left(\frac{P_{RMax} - P_{RMin}}{e}\right)\left(\frac{e}{n} - \frac{1}{n}\right) + \left(\frac{(V_H - V_L)}{k_{Reg}}\right) P_{RMin}$$

$$((V_{Nom} - V_L) P_{RMin} + (V_H - V_{Nom}) P_{RNom}) = \quad (23)$$

$$(V_H - V_L)\left(\frac{P_{RMax} - P_{RMin}}{e}\right)\left(\frac{e}{n} - \frac{1}{n}\right) + (V_H - V_L) P_{RMin}$$

$$((V_{Nom} - V_L) P_{RMin} + (V_H - V_{Nom}) P_{RNom}) - (V_H - V_L) P_{RMin} = \quad (24)$$

$$(V_H - V_L)\left(\frac{P_{RMax} - P_{RMin}}{e}\right)\left(\frac{e}{n} - \frac{1}{n}\right)$$

$$((V_{Nom} - V_L) P_{RMin} + (V_H - V_{Nom}) P_{RNom}) - \quad (25)$$

$$\frac{(V_H - V_L) P_{RMin}}{(V_H - V_L)}\left(\frac{e}{P_{RMax} - P_{RMin}}\right) = \frac{e - 1}{n}$$

$$\frac{((V_{Nom} - V_H) P_{RMin} + (V_H - V_{Nom}) P_{RNom})}{(V_H - V_L)}\left(\frac{e}{P_{RMax} - P_{RMin}}\right) = \frac{e - 1}{n} \quad (26)$$

$$n = \frac{((V_H - V_L))(P_{RMax} - P_{RMin})(e - 1)}{(e)((V_{Nom} - V_H) P_{RMin} + (V_H - V_{Nom}) P_{RNom})} \quad (27)$$

For motoring operation, using equations (8) and (20):

$$\frac{1}{k_{Mtrng}}((\Delta V_{RLNom}) P_{MNom} + (\Delta V_{RNomH}) P_{MMin}) = \quad (28)$$

$$\left(\frac{(V_H - V_L)}{k_{Mtrng}}\right)\left(\frac{P_{MMax} - P_{MMin}}{e}\right)\left(\frac{e}{n} - \frac{1}{n}\right) + \left(\frac{(V_H - V_L)}{k_{Mtrng}}\right) P_{MMin}$$

$$((\Delta V_{RLNom}) P_{MNom} + (\Delta V_{RNomH}) P_{MMin}) =$$

$$(V_H - V_L)\left(\frac{P_{MMax} - P_{MMin}}{e}\right)\left(\frac{e - 1}{n}\right) + (V_H - V_L) P_{MMin}$$

$$((V_{Nom} - V_L) P_{MNom} + (V_H - V_{Nom}) P_{MMin}) =$$

$$(V_H - V_L)\left(\frac{P_{MMax} - P_{MMin}}{e}\right)\left(\frac{e - 1}{n}\right) + (V_H - V_L) P_{MMin}$$

$$((V_{Nom} - V_L) P_{MNom} - (V_H - V_L) P_{MMin} + (V_H - V_{Nom}) P_{MMin}) =$$

$$(V_H - V_L)\left(\frac{P_{MMax} - P_{MMin}}{e}\right)\left(\frac{e - 1}{n}\right)$$

$$((V_{Nom} - V_L) P_{MNom} + (V_L - V_{Nom}) P_{MMin})\left(\frac{e}{P_{MMax} - P_{MMin}}\right) =$$

$$\left(\frac{e - 1}{n}\right)(V_H - V_L)$$

$$\frac{((V_{Nom} - V_L) P_{MNom} + (V_L - V_{Nom}) P_{MMin}) e}{(V_H - V_L)(P_{MMax} - P_{MMin})(e - 1)} = \left(\frac{1}{n}\right)$$

-continued $$n = \frac{(V_H - V_L)(P_{MMax} - P_{MMin})(e-1)}{((V_{Nom} - V_L)P_{MNom} + (V_L - V_{Nom})P_{MMin})e} \qquad (29)$$

Figure 7:
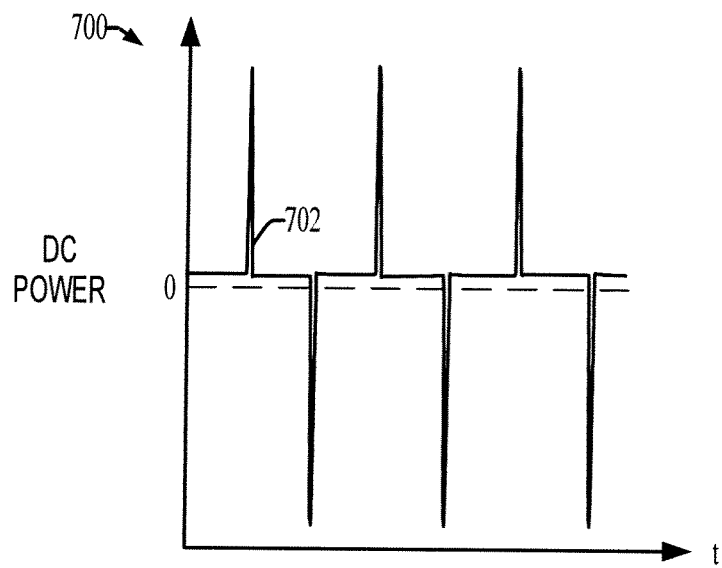
FIGS. 7-12 are signal diagram showing example waveforms during operation of various implementations of the power converter of FIGS. 1 and 2.
Figure 7:
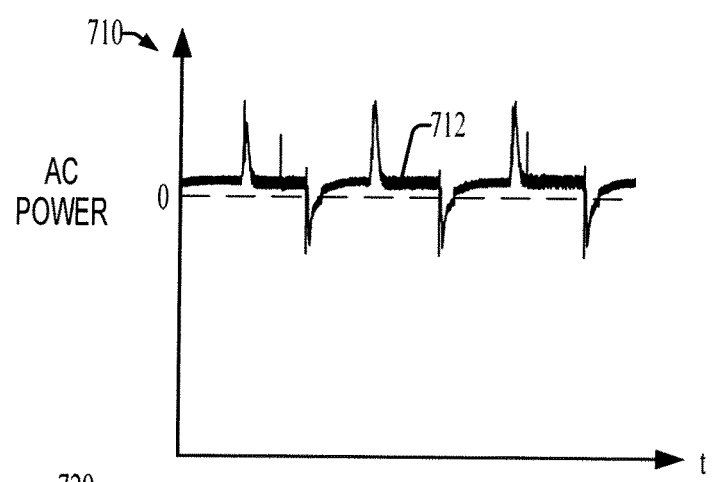
Figure 7:
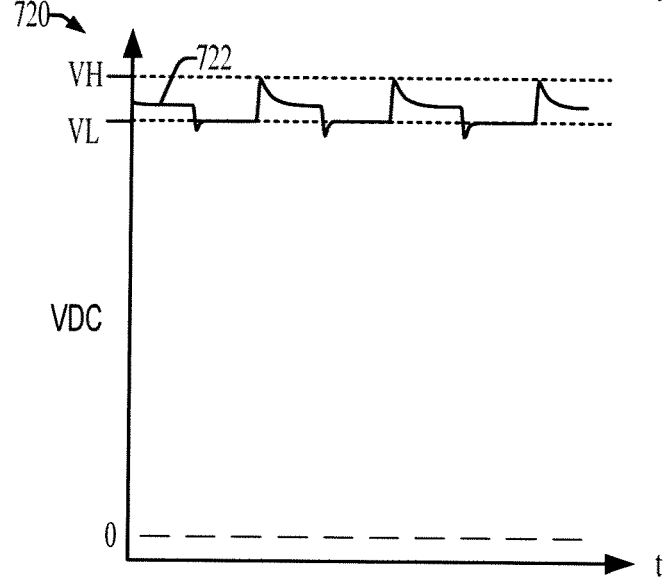

FIGS. 7-12 show simulation and lab test results for various example implementations of the above-described linear and non-linear dynamic bus control systems and methods. FIG. 7 shows simulated results including a graph 700 with a DC power curve 702 (P), a graph 710 with an AC power curve 712, and a DC bus voltage graph 720 with a DC bus voltage curve 722 for a non-linear dynamic bus control example (e.g., FIG. 5 above). In this example, the DC power pulse is much higher than the AC power pulse through several regenerating/motoring cycles in operation of the system, demonstrating that the system preferentially uses stored energy from the DC bus capacitor CDC and/or the external storage capacitor 160 at a high level, and only uses power from the line or source 104 as needed during motoring, and preferentially stores high amounts of energy in the DC bus capacitor CDC and/or the storage capacitor 160 during regenerating operation.

Figure 8:
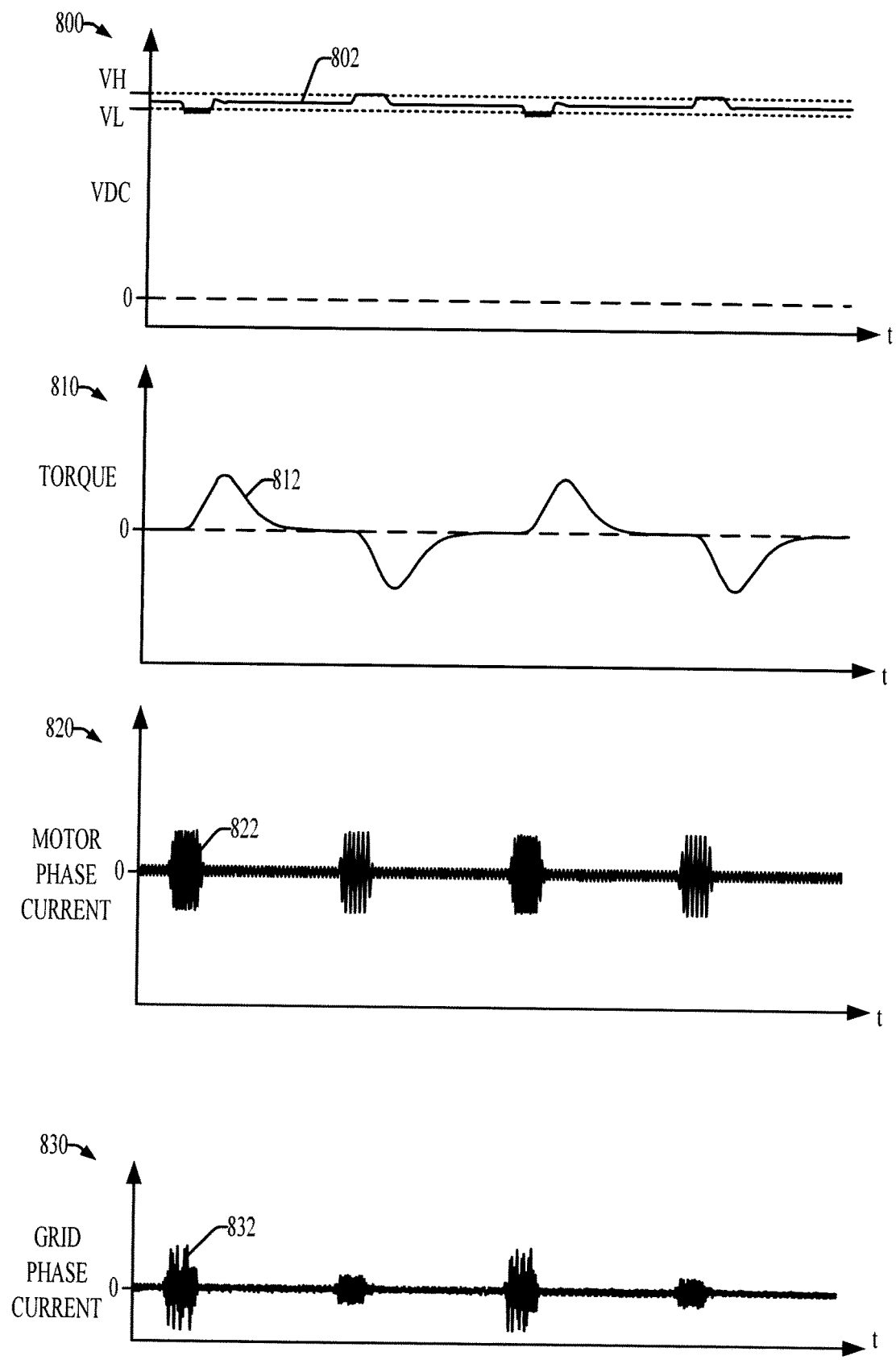
Figure 9:
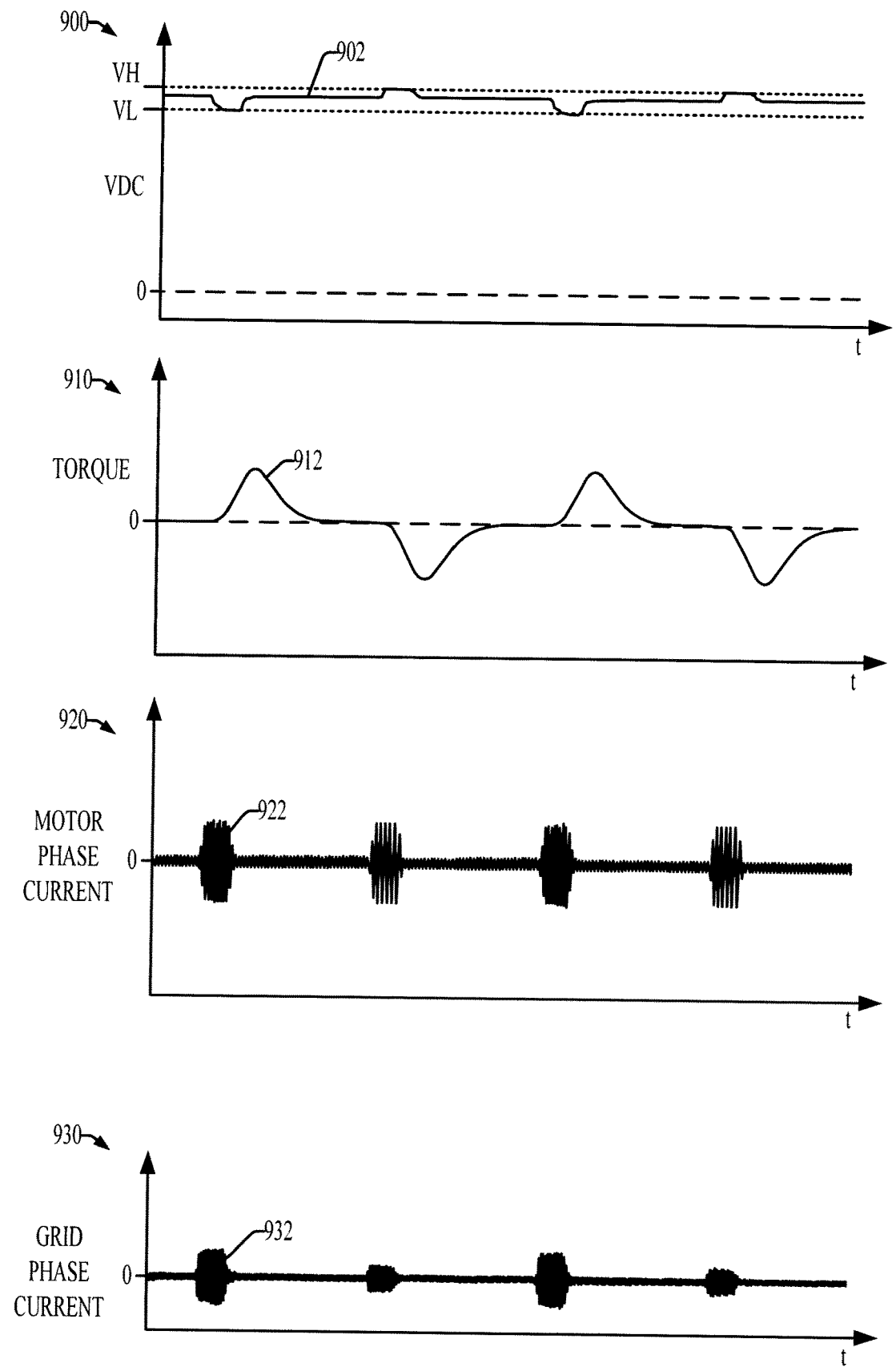

FIG. 8 shows experimental power limit results for a 3-level linear dynamic bus control implementation (e.g., FIG. 4), including a graph 800 with a DC bus voltage curve 802 regulated between upper and lower limits VH and VL, a graph 810 with a curve 812 representing the torque of the motor load 106 and FIG. 1 (e.g., positive is motoring, negative is regenerating), as well as a graph 820 with a motor phase current curve 822, and a graph 830 with an input (e.g., grid side) phase current curve 832. In this example, the piecewise linear power limiting in the dynamic bus controller 150 provides a certain amount of noise or chatter illustrated in the input phase current curve 832. FIG. 9 shows a comparative test using non-linear dynamic bus control (e.g., FIG. 5). FIG. 9 includes a graph 900 showing a DC bus voltage curve 902, a graph 910 with a motor load torque curve 912, as well as a graph 920 with a motor phase current curve 922, and a graph 930 with an input phase current curve 932. Comparing the curves 832 and 932 in FIGS. 8 and 9, respectively, the non-linear control implementation (e.g., FIG. 5 above) provides an improvement in smoother motor load operation (e.g., less chatter) compared with the piecewise linear approach of FIG. 4. The examples of FIGS. 8 and 9 use a peak load of three times the rating of the AFE rectifier 114, and an external capacitance of the storage capacitor 116 of 110 times the rating of the drive 102.

Figure 10:
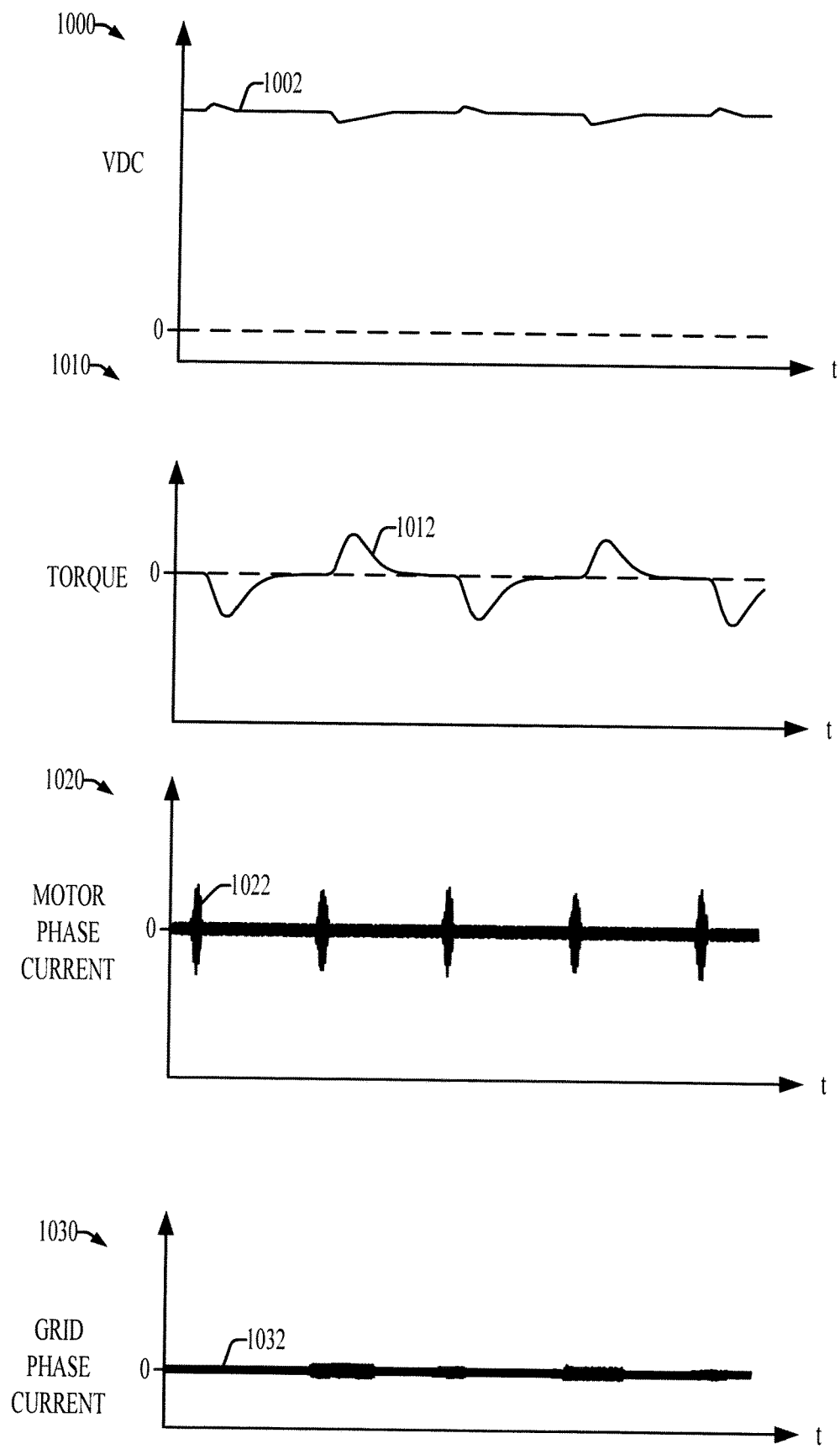
Figure 11:
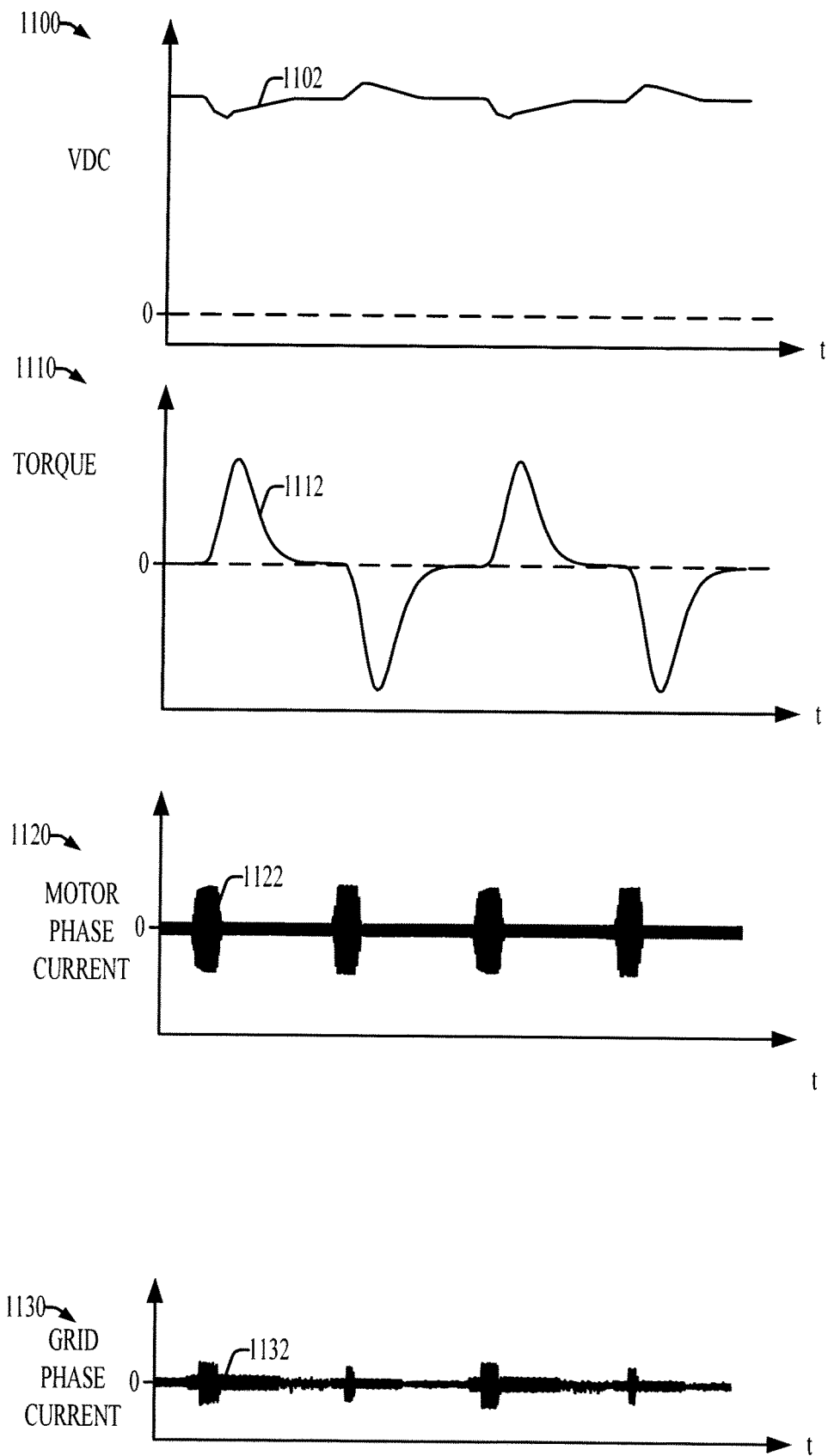
Figure 12:
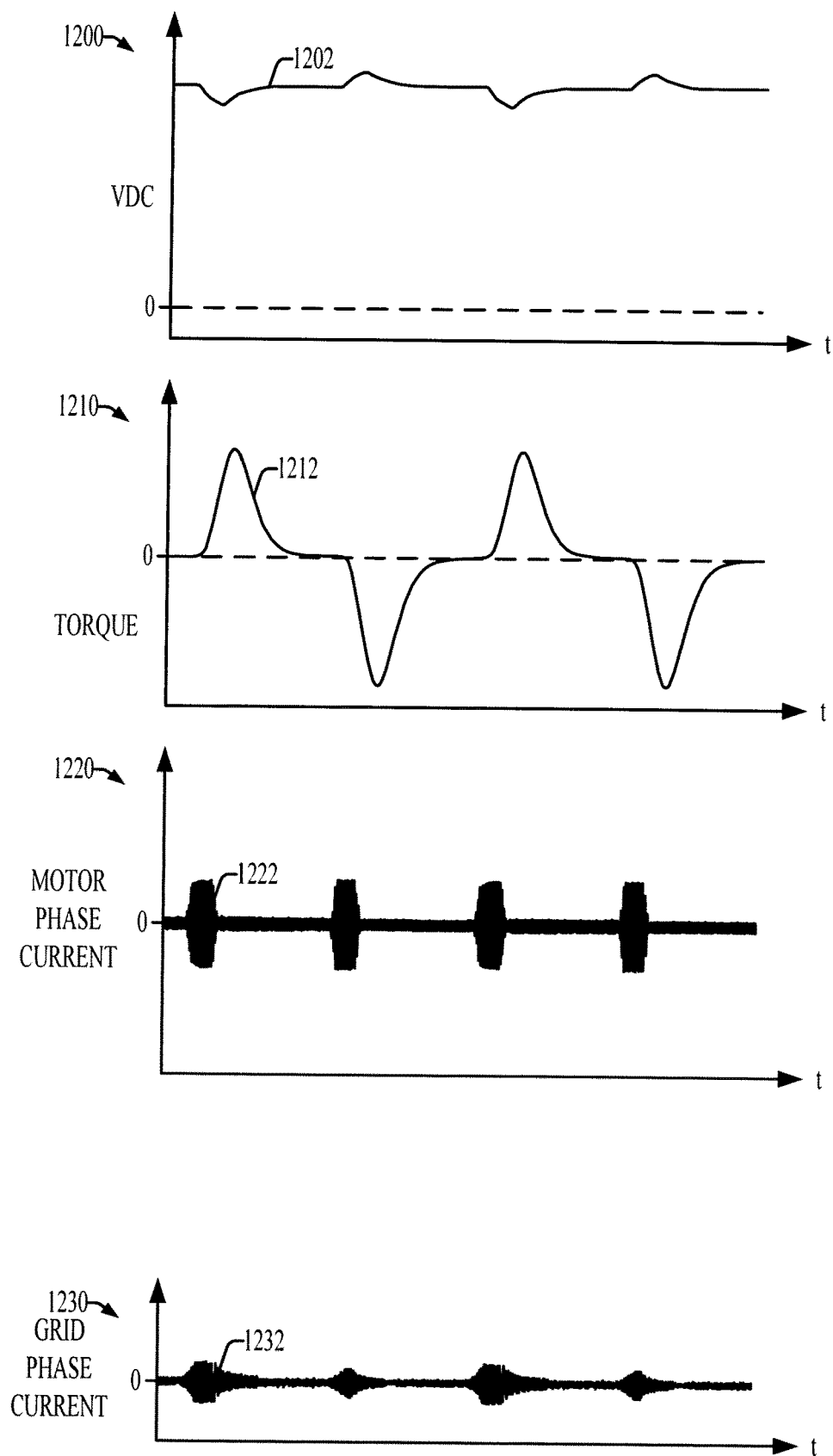

FIG. 10 shows experimental linear dynamic bus control results (e.g., FIG. 4), including a graph 1000 with a DC bus curve 1002, a graph 1010 with a motor load torque curve 1012, a graph 1020 with a motor phase current curve 1022, and a graph 1030 with an input phase current curve 1032. FIG. 11 shows experimental results for another linear dynamic bus control implementation, including a graph 1100 with a DC bus voltage curve 1102, a graph 1110 with a motor torque curve 1112, a graph 1120 with a motor phase current curve 1122, and a graph 1130 with an input phase current curve 1132. FIG. 12 shows comparative experimental results for a non-linear dynamic bus control implementation, including a graph 1200 with a DC bus voltage curve 1202, a graph 1210 with a motor torque curve 1212, a graph 1220 with a motor phase current curve 1222, and a graph 1230 with an input phase current curve 1232. The examples of FIGS. 11 and 12 show comparative linear and non-linear examples with a 200% torque setting.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power converter, comprising:
an AC input, including AC nodes;
a DC output, including first and second DC nodes;
a switching circuit coupled with the AC input and with the DC output, the switching circuit including switching devices respectively configured to selectively couple one of the AC nodes with a respective one of the first and second DC nodes according to a respective one of a plurality of switching control signal; and
a controller, including:
a modulation index controller configured to compute a modulation index according to a bus control input,
a modulator configured to generate the switching control signals according to the modulation index to cause the switching circuit to control a DC bus voltage at the DC output, and
a dynamic bus controller configured to generate the bus control input according to the DC bus voltage at the DC output, a direction of power flow at the DC output, and a power at the DC output:
wherein the dynamic bus controller is configured to:
for a regenerating direction of power flow at the DC output, limit the power at the DC output at a selected one of an integer number N constant regenerating power limit values in each respective one of N ranges of the DC bus voltage, where N is greater than 1; and
for a motoring direction of power flow at the DC output, limit the power at the DC output at a selected one of an integer number N constant motoring power limit values in each respective one of the N ranges of the DC bus voltage.

2. The power converter of claim 1, wherein the dynamic bus controller includes:
a voltage regulator configured to selectively regulate the DC bus voltage between first and second voltage limits; and
a power limiter configured to limit the power at the DC output according to the DC bus voltage.

3. The power converter of claim 1, wherein N is greater than 2.

4. A power converter, comprising:
an AC input, including AC nodes;
a DC output, including first and second DC nodes;
a switching circuit coupled with the AC input and with the DC output, the switching circuit including switching devices respectively configured to selectively couple one of the AC nodes with a respective one of the first and second DC nodes according to a respective one of a plurality of switching control signal; and
a controller, including:
 a modulation index controller configured to compute a modulation index according to a bus control input,
 a modulator configured to generate the switching control signals according to the modulation index to cause the switching circuit to control a DC bus voltage at the DC output, and
 a dynamic bus controller configured to generate the bus control input according to the DC bus voltage at the DC output, a direction of power flow at the DC output, and a power at the DC output;
wherein the dynamic bus controller is configured to:
for a regenerating direction of power flow at the DC output, limit the power at the DC output at a value computed according to a first non-linear function of the DC bus voltage; and
for a motoring direction of power flow at the DC output, limit the power at the DC output at a value computed according to a second non-linear function of the DC bus voltage.

5. The power converter of claim 1,
wherein successive ones of the regenerating power limit values increase with increasing ranges of the DC bus voltage; and
wherein successive ones of the motoring power limit values decrease with increasing ranges of the DC bus voltage.

6. The power converter of claim 4, wherein the first and second non-linear functions are of an order greater than 2.

7. The power converter of claim 4,
wherein the first non-linear function increases with increasing values of the DC bus voltage; and
wherein the second non-linear function decreases with increasing values of the DC bus voltage.

8. The power converter of claim 1, wherein the dynamic bus controller is configured to:
for a regenerating direction of power flow at the DC output, limit the power at the DC output in an increasing fashion with increasing values of the DC bus voltage; and
for a motoring direction of power flow at the DC output, limit the power at the DC output in a decreasing fashion with increasing values of the DC bus voltage.

9. A method, comprising:
for a regenerating direction of power flow at a DC output of a rectifier:
 controlling a DC bus voltage at the DC output between first and second regenerating voltage limits, and
 limiting power at the DC output according to a regenerating power limit parameter; and
for a motoring direction of power flow at the DC output:
 controlling the DC bus voltage at the DC output between first and second motoring voltage limits, and
 limiting power at the DC output according to a motoring power limit parameter;
for the regenerating direction of power flow at the DC output, limiting the power at the DC output at a selected one of an integer number N constant regenerating power limit values in each respective one of N ranges of the DC bus voltage, where N is greater than 1; and
for the motoring direction of power flow at the DC output, limiting the power at the DC output at a selected one of an integer number N constant motoring power limit values in each respective one of the N ranges of the DC bus voltage.

10. A method, comprising:
for a regenerating direction of power flow at a DC output of a rectifier:
 controlling a DC bus voltage at the DC output between first and second regenerating voltage limits, and
 limiting power at the DC output according to a regenerating power limit parameter; and
for a motoring direction of power flow at the DC output:
 controlling the DC bus voltage at the DC output between first and second motoring voltage limits, and
limiting power at the DC output according to a motoring power limit parameter;
for the regenerating direction of power flow at the DC output, limiting the power at the DC output at a value computed according to a first non-linear function of the DC bus voltage; and
for the motoring direction of power flow at the DC output, limiting the power at the DC output at a value computed according to a second non-linear function of the DC bus voltage.

11. The method of claim 10, comprising:
for the regenerating direction of power flow at the DC output, limiting the power at the DC output in an increasing fashion with increasing values of the DC bus voltage; and
for the motoring direction of power flow at the DC output, limiting the power at the DC output in a decreasing fashion with increasing values of the DC bus voltage.

12. A non-transitory computer readable medium that stores computer executable instructions, which, when executed by a processor, cause the processor to:
for a regenerating direction of power flow at a DC output of a rectifier:
 control a DC bus voltage at the DC output between first and second regenerating voltage limits, and
 limit power at the DC output according to a regenerating power limit parameter; and
for a motoring direction of power flow at the DC output:
 control the DC bus voltage at the DC output between first and second motoring voltage limits, and
 limit power at the DC output according to a motoring power limit parameter;
further comprising computer executable instructions, which, when executed by a processor, cause the processor to:
for the regenerating direction of power flow at the DC output, limit the power at the DC output at a selected one of an integer number N constant regenerating power limit values in each respective one of N ranges of the DC bus voltage, where N is greater than 1; and
for the motoring direction of power flow at the DC output, limit the power at the DC output at a selected one of an integer number N constant motoring power limit values in each respective one of the N ranges of the DC bus voltage.

13. A non-transitory computer readable medium that stores computer executable instructions, which, when executed by a processor, cause the processor to:
- for a regenerating direction of power flow at a DC output of a rectifier:
  - control a DC bus voltage at the DC output between first and second regenerating voltage limits, and
  - limit power at the DC output according to a regenerating power limit parameter; and
- for a motoring direction of power flow at the DC output:
  - control the DC bus voltage at the DC output between first and second motoring voltage limits, and
  - limit power at the DC output according to a motoring power limit parameter;
- further comprising computer executable instructions, which, when executed by a processor, cause the processor to:
  - for the regenerating direction of power flow at the DC output, limit the power at the DC output at a value computed according to a first non-linear function of the DC bus voltage; and
  - for the motoring direction of power flow at the DC output, limit the power at the DC output at a value computed according to a second non-linear function of the DC bus voltage.

14. The power converter of claim 4, wherein the dynamic bus controller includes:
- a voltage regulator configured to selectively regulate the DC bus voltage between first and second voltage limits; and
- a power limiter configured to limit the power at the DC output according to the DC bus voltage.

15. The power converter of claim 4, wherein the dynamic bus controller is configured to:
- for a regenerating direction of power flow at the DC output, limit the power at the DC output in an increasing fashion with increasing values of the DC bus voltage; and
- for a motoring direction of power flow at the DC output, limit the power at the DC output in a decreasing fashion with increasing values of the DC bus voltage.

16. The method of claim 10, comprising:
- for the regenerating direction of power flow at the DC output, limiting the power at the DC output in an increasing fashion with increasing values of the DC bus voltage; and
- for the motoring direction of power flow at the DC output, limiting the power at the DC output in a decreasing fashion with increasing values of the DC bus voltage.

17. The non-transitory computer readable medium of claim 12, further comprising computer executable instructions, which, when executed by a processor, cause the processor to:
- for the regenerating direction of power flow at the DC output, limit the power at the DC output in an increasing fashion with increasing values of the DC bus voltage; and
- for the motoring direction of power flow at the DC output, limit the power at the DC output in a decreasing fashion with increasing values of the DC bus voltage.

18. The non-transitory computer readable medium of claim 13, further comprising computer executable instructions, which, when executed by a processor, cause the processor to:
- for the regenerating direction of power flow at the DC output, limit the power at the DC output in an increasing fashion with increasing values of the DC bus voltage; and
- for the motoring direction of power flow at the DC output, limit the power at the DC output in a decreasing fashion with increasing values of the DC bus voltage.

* * * * *